United States Patent [19]

Katz

[11] 4,128,791

[45] Dec. 5, 1978

[54] PHASE SHIFT CIRCUIT FOR SYNCHRONOUS MOTOR

[76] Inventor: Jonathon H. Katz, 78 Cypress St., Brookline, Mass. 02146

[21] Appl. No.: 789,975

[22] Filed: Apr. 22, 1977

[51] Int. Cl.² .............................................. H02P 7/36
[52] U.S. Cl. .................................... 318/724; 318/751; 318/781
[58] Field of Search ............... 318/165, 166, 168, 189, 318/200, 220 R, 221 D, 228

[56] References Cited

U.S. PATENT DOCUMENTS

| | | | |
|---|---|---|---|
| 1,894,455 | 1/1933 | Youhouse | 318/165 X |
| 2,539,144 | 1/1951 | Kuhlmann | 318/166 X |
| 2,784,362 | 3/1957 | Chang | 318/220 R X |
| 3,007,098 | 10/1961 | Skrobisch | 318/189 X |
| 3,549,969 | 12/1970 | Yoshimura | 318/220 X |

*Primary Examiner*—Gene Z. Rubinson

[57] ABSTRACT

Capacitive phase shift circuitry for supplying current to the two coils of a synchronous motor at a desired voltage and phase relation, without the need for a voltage drop resistor.

5 Claims, 2 Drawing Figures

PHASE SHIFT CIRCUIT FOR SYNCHRONOUS MOTOR

FIELD OF THE INVENTION

This invention relates to phase shift circuitry for a synchronous motor.

BACKGROUND OF THE INVENTION

Such circuits have traditionally been bulky and inefficient, usually using voltage drop resistors that not only dissipate electric power but also decrease the efficiency and operating torque of the motor.

SUMMARY OF THE INVENTION

The invention features, in some embodiments, the use of capacitors to boost the voltage and shift the phase of the current supplied to each of the two coils of a synchronous motor, the capacitances being selected to produce the desired phase relation and to minimize any difference in the amplitudes of the voltages across the coils. In other embodiments capacitors are respectively connected in series and in parallel with the same coil to produce the desired voltage and phase relation. In preferred embodiments switches are provided to reverse motor direction.

Other novel features, elements, aspects, and advantages and combinations thereof will be set forth hereinafter.

DESCRIPTION OF PREFERRED EMBODIMENTS

I now turn to a description of presently preferred embodiments of the invention.

DRAWINGS

Figure 1:
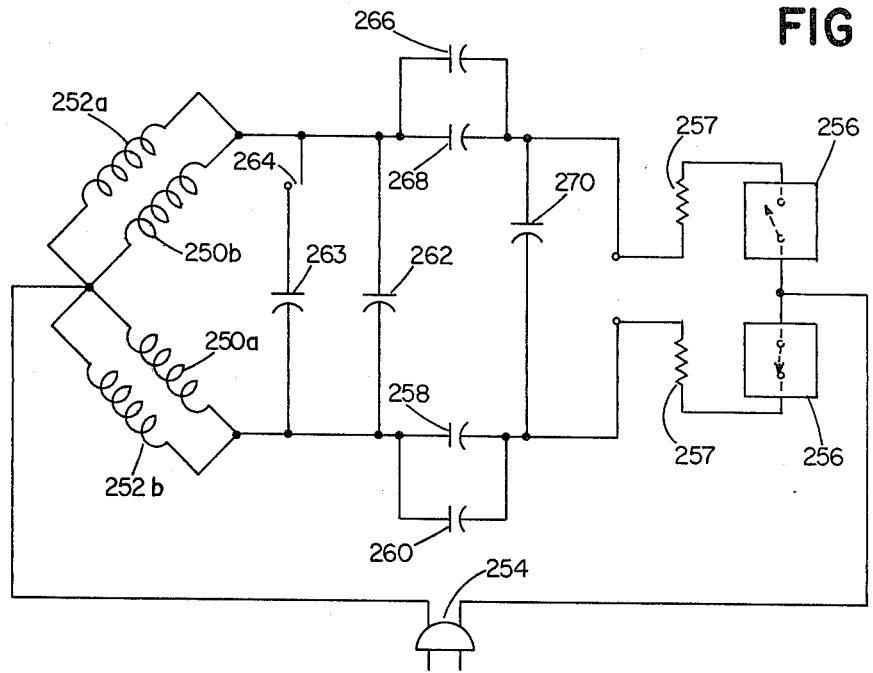
Figure 2:
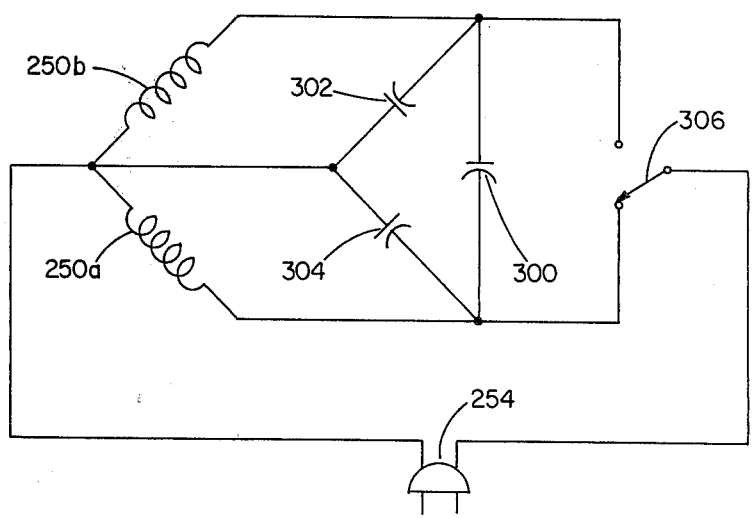

FIGS. 1 and 2 are circuit diagrams of two embodiments of phase shift circuitry for driving synchronous motors.

DESCRIPTION

The embodiments shown in the drawings and their operation are now described.

1. Embodiments

In my copending applicaiton entitled "Circuit Board Testing Apparatus" (incorporated herein by reference) there is disclosed apparatus in which a carrier assembly is driven by synchronous motors through sprocket wheels and chains. Two oppositely rotating motors drive each chain.

FIG. 1 shows a phase shift network for the two motors driving one chain; a duplicate of this circuitry is provided to drive the other two motors. The coils 250a and 252b and 252a and 250b of the two motors, respectively, are connected in parallel to receive power from 60 Hz, 120 volt source 254 for driving the motors in opposite directions. Two solid state switches 256 (each with a protective 2 ohm series resistor 257) combine to make up a SPDT switch for reversing the direction of the motors. Source 254 is connected across coils 250a and 252b through a parallel pair of 3.3 mfd capacitors 258 and 260. Source 254 is connected across coils 250b and 252a through two parallel paths, the first of which contains capacitors 258 and 260 in series with 1.0 mfd capacitor 262 (for 50 Hz power line operation additional 1 mfd capacitor 263 can be connected in parallel with capacitor 262 by switch 264), the second of which contains another parallel pair of 3.3 mfd capacitors 266 and 268 in series with 3.3 mfd capacitor 270. When the switches are reversed the power connections across the coils are simply reversed.

FIG. 2 shows another phase shift network, here shown driving a single motor with coils 250a and 250b. Source 254 is connected directly across coil 250a, and is connected across coil 250b through a 1 mfd series capacitor 300. Capacitors 302 and 304, each 1 mfd, are respectively connected in parallel with coils 250b and 250a. Switch 306 is provided to reverse the power connections across the coils.

2. Operation

In operation of the circuit of FIG. 1, one coil of each motor always receives current through 6.6 mfd which, when the motor is at idle, boosts the coil voltage to about 50% above the supply voltage, with a phase shift of about 50° relative to the supply voltage. Current is supplied to the second coil through 2.2 mfd of capacitance (the net of capacitors 266, 268, and 270), and combines with additional current bled off from the supply to the first coil and given additional phase shift by the 1 mfd capacitance (2 mfd for 50 Hz) through which it passes. As a result, the net current supplied to the second coil is at a voltage which, at idle, is approximately equal in magnitude to, and yet (at about 135° relative to line phase) approximately 95° out of phase with, the voltage across the first coil. Under motor load the voltages change, but in the same direction and at approximately the same rate for each coil, so that at full load both coils receive about 150 volts, are thus operated at well above the supply voltage with resultant high power output. (Typically, synchronous motors are designed to operate at voltages substantially above their rated voltage, to allow for the higher idling voltages associated with conventional Rc networks). Further, the phase shifts change very little under motor load, so that at full load the relative phase shift is about 85°, still very close to the optimum 90° for synchronous motors. The absence of any substantial resistance in the phase shift network reduces electrical power dissipation (and resulting heat) and, makes possible a physically compact circuit. Current drawn is very uniform, and operation is very quiet. As selected, the capacitance values require the use of only two different size capacitors, and permit switching to 50 Hz operation by changing only one circuit value.

In operation of the circuit of FIG. 2, coil 250a receives current directly from the voltage source. Coil 250B receives current through capacitor 300 which tends to increase its voltage above the supply voltage and provides a substantial phase shift. Capacitor 302 partially counteracts the voltage boost and the phase shift. Loading of the motor reduces the voltage across coil 250B to approximately supply voltage, while the phase shift remains to close to the optimum 90°. Although both voltage and phase shift vary with loading, the values remain much closer to optimum than with a conventional circuit using a voltage drop resistor. Further, heat producing power dissipation, as well as the value of the series capacitor, are reduced, and operation is quiet. The third capacitor (304, or, when switch 306 is reversed, 300), connected across source 254, plays no phase shift role but, in addition to making the circuit reversible, tends to balance out inductive effects and provide a power factor of close of unity.

Conclusion

Other embodiments are within the claims below.

What is claimed is:
1. A synchronous motor system comprising
a two-phase synchronous motor having first and second phase windings, and
drive circuitry comprising
   a voltage source,
      one terminal of said source being effectively connected to one end of each of said first and second windings,
   a first capacitance connected between the other terminal of said source and the other end of said first windings,
   a second capacitance connected between said other terminal of said source and the other end of said second windings, and
   a third capacitance connected between the junction of said first capacitance with said first windings and the junction of said second capacitance with said second windings,
   said capacitance being selected to produce a desired phase relation and to minimize any amplitude difference in the voltage supplied to said first and second windings.

2. The system of claim 1 wherein an additional capacitance is arranged to be switched into parallel with said third capacitance to adapt said circuit to operation with a power source of selected frequency.

3. The system of claim 1 wherein said connections of each of said first and second capacitances to said other terminal of said source are through a motor reversing switch, and a fourth capacitance is connected between the junction of said switch with said first capacitance and the junction of said switch with said second capacitance.

4. A synchronous motor system comprising
a two-phase synchronous motor having first and second phase windings, and
drive circuitry comprising
   a voltage source,
      one terminal of said source being effectively connected on one end of each of said first and second windings,
   a first capacitance connected between the other ends of said first and second windings, and
   a second capacitance connected between the junction of said first capacitance with said other end of said first windings and said one terminal of said source,
   the other terminal of said source being connected to the junction of said first capacitance with the other end of said second windings,
   said capacitances being selected to produce a desired phase relation and to minimize any amplitude difference in the voltage across said first and second windings.

5. The system of claim 4 further comprising a third capacitance connected between said one terminal and the junction of said first capacitance with said other end of said second windings,
said connection of said other terminal to said junction of said first capacitance with said other end of said second windings being through a motor reversing switch,
said other terminal being additionally connected through said switch to said junction of said first capacitance with said other end of said first windings.

* * * * *